May 20, 1941.  A. E. BRONSON  2,242,568
VULCANIZING UNIT
Filed March 21, 1940
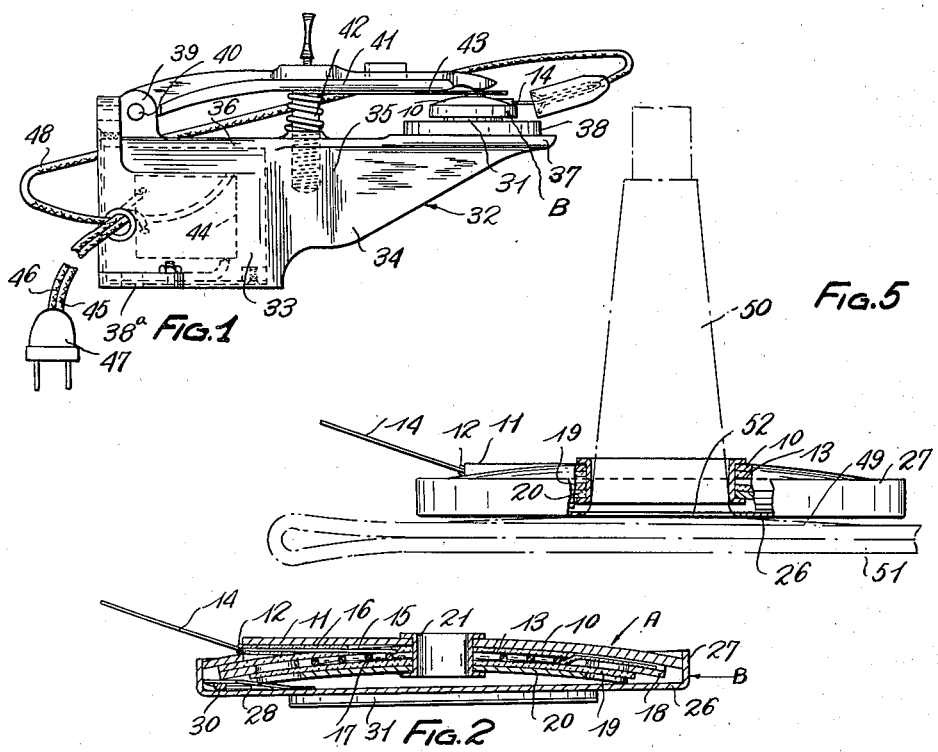
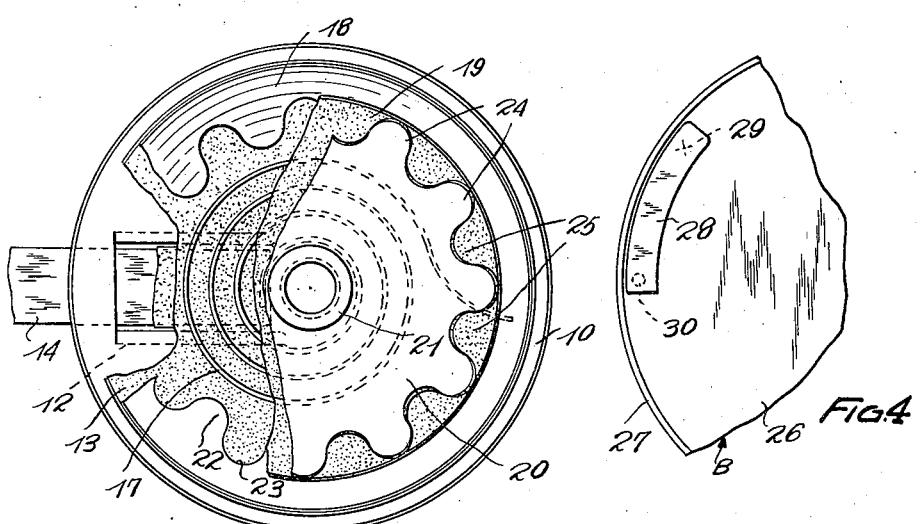
INVENTOR.
ADELBERT E. BRONSON
BY
Kwis Hudson & Kent
ATTORNEYS Patented May 20, 1941

2,242,568

UNITED STATES PATENT OFFICE 2,242,568

VULCANIZING UNIT

Adelbert E. Bronson, Shaker Heights, Ohio, assignor to The Dill Manufacturing Company, Cleveland, Ohio, a corporation of Ohio Application March 21, 1940, Serial No. 325,213

5 Claims. (Cl. 18—18)

This invention relates to an electrical vulcanizing unit which is adapted to be used to vulcanize repair patches or the rubber bases of valve stems on the inner tubes of pneumatic tires and other inflatable rubber articles.

The vulcanizing unit embodying the present invention is of the general type of vulcanizing unit shown in the reissued patent of John C. Crowley, No. Re. 21,230, reissued October 10, 1939, and constitutes an improvement thereon.

The vulcanizing unit disclosed in said Crowley reissue patent comprises two separable parts which in use are nested or superimposed one within or upon the other. One of said parts carries the vulcanizing patch or rubber based valve stem, while the other of said parts is adapted to have pressure applied thereto by a suitable clamp and is provided with an electrical heating element for creating the vulcanizing heat.

An object of the present invention is to provide a vulcanizing unit of the type specified and which is so constructed that the two separable members forming the unit can in use be arranged in any relative nested or superimposed position and will function when so nested or superimposed without danger of short-circuiting the electrical resistance or heating element.

A further object is to provide a vulcanizing unit of the type specified, which is so designed and constructed that it can be economically manufactured, readily used since there is no necessity of nesting or superimposing the members forming the unit in any particular or predetermined relationship and which unit in use will be efficient.

Further and additional objects and advantages not hereinbefore specified will become apparent hereinafter during the detailed descriptions of several embodiments of the invention which are to follow. Referring to the accompanying drawing illustrating said embodiments, Fig. 1 shows in an elevational view one form of vulcanizing unit embodying the invention and positioned in a suitable clamping means, the scale of this view being substantially one-half actual size.

Fig. 2 is a transverse vertical sectional view through the vulcanizing unit shown in Fig. 1 and on a scale substantially twice the size of the actual unit.

Fig. 3 is a bottom plan view of the vulcanizing unit shown in Fig. 2, with certain portions broken away to clearly illustrate other portions lying above.

Fig. 4 is a fragmentary top plan view of the patch carrying member of the vulcanizing unit, and Fig. 5 is a transverse sectional view showing a vulcanizing unit embodying the invention but modified so as to be used for vulcanizing the rubber base of a valve stem to an inner tube, said valve stem being indicated in this view by dot and dash lines.

The vulcanizing unit shown in Figs. 1 to 4 inclusive comprises two separable members, namely, the member which carries the electrical resistance element indicated generally by the letter A, and the member which carries the patch, indicated generally by the letter B. These two members in use are arranged with the member A nested within the member B and pressure is applied to the member A by suitable clamping means, one form of which is illustrated by way of example in Fig. 1 and will be referred to more in detail later.

The member A comprises a metal disk 10 of concave convex form and this disk is provided with a radially extending upwardly deformed portion 11 in the nature of a channel and terminating in a slit 12 located inwardly of the circumferential edge of the disk 10 and adapted to receive an elongated terminal strip later to be referred to.

The plate or disk 10 is provided with a central opening that registers with a central opening in a disk 13 of suitable insulating material such as asbestos arranged on the concave side of the plate or disk 10 and extending to closely adjacent the circumferential edge of said plate or disk.

An elongated relatively thin terminal strip 14 extends through the slit 12 in the plate or disk 10 and passes within the deformation or channel 11 and through a slit 15 in the insulating disk 13 to the underside of the latter and adjacent the central opening therein. The terminal strip 14 is insulated from the plate or disk 10 by suitable insulation indicated at 16.

It will be observed that the terminal strip 14 extends well beyond the circumferential edge of the plate or disk 10 and is disposed at an upwardly extending angle, as viewed in the drawing, for the purpose of having the exposed uninsulated outer end of said strip located in a position wherein it will not contact either the member A or the member B of the vulcanizing unit when the two members are nested as shown in Fig. 2.

The inner end of the terminal strip 14 after it passes through the slit 15 in the insulating disk 13 is electrically connected to one end of a spirally wound electrical resistance or heating element 17 that is located on the underside of the insulating disk 13. The other or outer end of the spirally wound heating element 17 is contacted by an annular metal ring 18 mounted concentrically with respect to the disk or plate 10 and the insulating disk 13 and contact the latter adjacent its circumference and insulated thereby from the metal disk or plate 10.

A second insulating disk of asbestos or other suitable insulating material 19 is arranged beneath the ring 18, as viewed in Fig. 2, and overlies the inner circumferential edge of the ring 18 but is less in diameter than the diameter of the insulating disk 13. The insulating disk 19 is also provided with a central opening that is in alignment with the central openings in the disk or plate 10 and the insulating disk 13. The parts hereinbefore referred to are held in assembled relation by means of a convex concave metal disk 20 engaging the underside of the insulating disk 19, as viewed in Fig. 2, and provided with a central opening aligning with the central openings previously referred to. It will be noted that the ring 18 is also insulated from the disk 20 by the insulating disk 19. A rivet 21 extends through the central openings in the plates or disks 10, 13, 19 and 20 and securely clamps the elements of the member A in assembled relationship.

In order to provide an economical construction the ring 18 and the disk 20 are formed from a single convex concave metal disk. The ring 18 and the disk 20 can be severed from the single disk by means of simple severing operations which will be well understood and along a scalloped line which provides the ring 18 on its inner circumferential edge with alternate substantially radially extending projections 22 and recesses 23, while the outer circumferential edge of the disk 20 is provided with alternate substantially radially extending projections 24 and recesses 25. The arrangement just explained eliminates any waste of material in the manufacture of the member A, while the projections 22 on the ring 18 increase the bearing engagement of the ring with the insulating disk 13 and similarly the projections 24 on the disk 20 provide ample bearing engagement of the disk with the insulating disk 19, and the whole assembly is such that all of the parts can be firmly clamped together in operative relationship by the rivet 21 with the ring 18 insulated from the disks 10 and 20 and the rivet 21.

The patch carrying member B is in the form of a cup-shaped metal stamping 26 that has an unbroken upstanding wall 27. The size of the member B is such that when the member A is nested therein, as illustrated in Fig. 2, the circumferential edge of the plate or disk 10 of the member A will contact the inner side of the unbroken wall 27 of the member B.

The cup-shaped member 26 has arranged therein a spring contact finger 28, one end of which is permanently secured to the bottom wall of the cup-shaped member and interiorly thereof by suitable means such as welding, as indicated at 29 in Fig. 4, it being understood, however, that said end of the contact spring finger 28 might be secured by other suitable means such as riveting, soldering or the like. The opposite end of the contact finger 28 is secured to the bottom wall of the member B by means of fusible solder 30 and which solder flexes said spring finger 28 upwardly, as clearly indicated in Fig. 2, and into contact with the metal ring 18 adjacent the circumferential edge thereof. The underside of the cup-shaped member 26 carries the vulcanizing patch 31.

It will be understood that in using the vulcanizing unit the members A and B are nested in the manner shown in Fig. 2 and can be mounted in a suitbale clamping means with the patch 31 in engagement with the tire tube or other inflatable article to which it is to be vulcanized, while the pressure applying part of the clamp is in contact with the plate or disk 10, preferably adjacent the central portion thereof where the rivet 21 is located.

It will further be noted that the parts A and B do not have to be nested in any specified or predetermined relationship, since the contact finger 28 will always engage the metal ring 18 in whatever position the member A is located within the cup-shaped member B, while the outer end of the terminal strip 14 is so shaped and positioned as to obviate all danger of its contacting the members A or B and causing a short-circuiting of the electrical resistance or heating element 17.

Assuming that the vulcanizing unit is grounded through the clamp, it will be seen that when the terminal strip 14 is connected to one side of an electrical circuit of suitable strength the current will flow through said strip and through the resistance or heating element 17, ring 18, spring contact finger 28, the cup-shaped member 26 including the wall 27 thereof, and the plate or disk 10 to ground through the clamp. This flow of current through the resistance element generates the vulcanizing heat and as soon as said heat reaches a predetermined point calculated to prevent overheating of the patch and rubber article being vulcanized together the fusible solder 30 will fuse and the spring contact finger 28 will move downwardly because of its inherent spring tension out of contact with the ring 18, thus breaking the ground connection and the circuit through the heating element 17.

It will be understood that the member B of the unit can be discarded after use and that the member A can be used each time with a different member B. The unit can be packaged for sale and distribution to include one member A and a number of members B. Also a user might purchase as replacements a number of the members B to use with the member A of the original unit which he bought.

By way of illustration I have shown in Fig. 1 a suitable form of clamp with which the vulcanizing unit can be employed. The clamp shown in Fig. 1 comprises a body indicated generally at 32 and in the form of a metal casting. The body 32 is provided at one end of the clamp with a substantially rectangular housing compartment 33, from the forward end of which, the right hand end as viewed in Fig. 1 and midway between its sides, extends the integral rib 34 connected to the housing compartment 33 by a rounded hollow portion 35. The upper side of the housing compartment 33 is provided with a centrally disposed raised integral portion 36 that extends forwardly and overlies the upper edge of the rib 34. The horizontal portion that overlies the rib 34 merges into the enlarged circular and horizontal vulcanizing table 37 which is recessed on its upper side to receive an article supporting cushion 38, preferably formed of fairly soft rubber. The lower rear corners of the housing compartment 33 are provided with integral laterally extending ears 38a having openings therein through which suitable fastening means can be passed for securing the clamp to a supporting surface. The upper side of the housing compartment 33 is provided with forwardly extending parallel spaced ears 39 provided with aligned openings in which is mounted a pivot pin 40 that pivotally supports the clamping arm now to be described.

The clamping arm is preferably in the form of an integral metal casting and includes a substantially horizontal portion 41 that is provided on its upper side with a vertical rib having intermediate its ends an oval-shaped portion through which extends an elongated slot for the purpose of allowing a clamping screw, later to be referred to, to pass therethrough. The outer end of the arm 41 is fork-shaped and overlies the article supporting table 37. A clamping screw 42 extends through the clamping arm and through the tubular portion 35 of the body and carries a coil spring that engages the upper side of the body and the underside of the clamping arm. A plate 43 is pivotally mounted on the clamping screw beneath the arm 41 and extends along the underside of the arm to overlie the fork at the outer end thereof, the purpose of said plate being to enable the clamp to be used with a vulcanizing unit for vulcanizing either plain rubber patches or the rubber bases of valve stems, as will be well understood.

The housing portion 33 of the body contains a suitable transformer indicated at 44 by dotted lines. The primary of this transformer has its opposite ends connected to the two wires 45 and 46 of an elongated extension cord that carries at its end a plug 47 for connecting the transformer with a commercial electric current source. The secondary of the transformer has one of its ends connected to the body of the clamp, while its other end is connected to a lead wire 48 that extends outwardly of the housing compartment and has fixed to its outer end an electrical connecting clip enabling the wire to be connected to the terminal strip 14 of the vulcanizing unit.

It will be understood that when the vulcanizing unit is mounted in the clamp, as indicated in Fig. 1, with the lead wire 48 connected to the terminal strip 14 of the unit, and with the transformer of the clamp connected with a source of electrical energy, current from the secondary of the transformer will flow through the resistance element and the parts of the unit in the manner previously described and through the clamp.

It will be understood, of course, that the vulcanizing unit can be used with other forms of clamps and with clamps not equipped with transformers. In the latter instance one side of the source of electrical energy would be connected directly to the terminal strip 14 and the clamp could be grounded or connected to the other side of said source of electrical energy.

From the foregoing description it will have been seen that the vulcanizing unit embodying the present invention is so constructed that the members thereof can be quickly assembled or nested without regard to relatively positioning said members in any predetermined way. It will also have been seen that the members are so constructed that there is no danger of the resistance element being short-circuited through engagement of the terminal strip 14 with either the member A or the member B of the unit. It will be recalled that the unit is formed of simple inexpensive parts which can be produced by easy manufacturing operations since they are mainly in the form of stampings and the like and that the ring 18 and the disk 20 are formed from a single metal disk without any waste of material.

In Fig. 5 the vulcanizing unit is modified to adapt it for use in vulcanizing the rubber base 49 of a valve stem 50 to a tire tube 51 or other inflatable article. The tube, rubber base and valve stem are indicated in Fig. 5 by dot and dash lines. The alteration of the unit for this purpose merely entails providing a central opening 52 in the member B through which the valve stem can extend and in having the hollow rivet 21 on the member A of such size that the valve stem can extend therethrough, but otherwise the construction is the same.

In connection with the modified form it will also be understood that such form can be used in a clamp such as shown in Fig. 1, and, in which event, the plate 43 will be swung from beneath the arm 41 and the member A engaged by the forked outer end of the arm with the valve stem passing between the tines of said fork.

Although several preferred embodiments of the invention have been illustrated and described herein, it will be understood that the invention is susceptible of various modifications and adaptations within the scope of the appended claims.

Having thus described my invention I claim:

1. A vulcanizing unit comprising two separable members adapted in use to be nested one within the other, one of said members comprising a pair of spaced superposed metal disks, an electrical heating element arranged between said disks and insulated therefrom, terminal means extending from the outer side of one of said disks and insulated from the said one disk and electrically connected to one end of said element, a metal ring insulated from said disks and electrically connected to the other end of said element, the other of said members comprising a sheet metal cup provided on its outerside with a vulcanizing patch and having a side wall which in use contacts the said one disk of the said one member, said other member being provided with means which in use normally electrically connects said other member with said ring irrespective of the relative nested positions of said members.

2. A vulcanizing unit comprising two separable members adapted in use to be nested one within the other, one of said members comprising a pair of spaced superposed metal disks, an electrical heating element arranged between said disks and insulated therefrom, terminal means extending outwardly of the outer side of one of said disks and insulated from the said one disk and electrically connected to one end of said element, a metal ring insulated from said disks and electrically connected to the other end of said element, the other of said members comprising a sheet metal cup provided on its outerside with a vulcanizing patch and having a side wall which in use contacts the said one disk, said other member being provided interiorly thereof with a spring contact arm, one end of which is permanently connected to the bottom of said other member and the other end of which is spaced therefrom by a fusible connection, said contact finger normally engaging said ring when said members are nested, wherefore said members can be nested in any relationship with respect to each other.

3. A vulcanizing unit comprising two separable members adapted in use to be nested one within the other, one of said members comprising a metal disk, an electrical heating element associated therewith and insulated therefrom, terminal means extending from the outer side of said disk and insulated therefrom and electrically connected to one end of said element, electrically conductive means associated with said disk but insulated therefrom and electrically connected to the other end of said element, the other of said members comprising a sheet metal cup provided on its underside with a vulcanizing patch and having a side wall which in use contacts said disk, said other member including means which when said members are nested electrically contacts the electrically conductive means of said one member.

4. A vulcanizing unit comprising two separable members adapted in use to be nested one within the other, one of said members comprising a metal disk and having an outwardly projecting deformation therein extending toward and terminating adjacent to the periphery of the disk in a slit, terminal means mounted in said deformation and insulated from said disk and extending outwardly from said slit, an electrical heating element associated with said disk and insulated therefrom and having one of its ends connected to said terminal means, an electrically conductive means associated with said disk and insulated therefrom and connected to the other end of said element, the other of said members comprising a sheet metal cup provided on its underside with a vulcanizing patch and having a side wall which in use contacts said disk, said other member being provided with means which when said members are nested electrically contacts said electrically conductive means.

5. A vulcanizing unit comprising a patch carrying member and a member provided with an electrical heating element, said members being separable but in use having the last mentioned member nested within the patch carrying member, said last mentioned member comprising a metal disk, terminal means extending through said disk and insulated therefrom, an electrical heating element associated with said disk and having one of its ends connected to said terminal means, a metal ring associated with said disk and electrically connected to the other end of said element, a second metal disk operatively associated with said first named disk, and means interposed between said disks insulating said element and said ring therefrom, said ring and said second disk being formed from a single metal disk with the inner periphery of said ring complementary to the periphery of said second disk.

ADELBERT E. BRONSON.